United States Patent [19]
Russell

[11] 4,183,670
[45] Jan. 15, 1980

[54] INTERFEROMETER

[76] Inventor: Robert B. Russell, 288 Heath St., Chestnut Hill, Mass. 02167

[21] Appl. No.: 941,047

[22] Filed: Sep. 11, 1978

Related U.S. Application Data

[63] Continuation-in-part of Ser. No. 853,033, Nov. 30, 1977, abandoned.

[51] Int. Cl.² ............................ G01B 9/02; G01P 9/00
[52] U.S. Cl. .................................................. 356/350
[58] Field of Search ................ 356/106 LR, 113, 350, 356/354

[56] References Cited
U.S. PATENT DOCUMENTS

| | | | |
|---|---|---|---|
| 3,468,608 | 9/1969 | Doyle | 356/106 LR |
| 3,512,890 | 5/1970 | McLaughlin | 356/106 LR |
| 3,517,982 | 6/1970 | Fonda-Bonardi | 356/113 |
| 3,825,347 | 7/1974 | Kaiser | 356/113 |
| 4,035,081 | 7/1977 | Sepp et al. | 356/106 LR |

OTHER PUBLICATIONS
"New Module Splits Laser Beams," Aviation Week & Space Tech., vol. 79, #17, Oct. 21, 1963, pp. 95 & 97.

*Primary Examiner*—Vincent P. McGraw

[57] ABSTRACT

An interferometer device and method for detecting variations in the effective path length of light on opposite sides of an enclosed ring-like optical path. Laser light is split and passed in opposite directions around an area in one or more planes to a point where the beams come together at which point they are directed, in coincidence, into one or more photodetectors. A variable light delay means is located in each light path and each delay means is operated repetitively to vary the delay by a selected amount and at a selected rate to produce repeating bursts of selected beat frequencies at said photodetector. After heterodyning the beat frequencies down, the differences therebetween are repetitively measured by a frequency counter to a high degree of accuracy by long term averaging. Slow rates of rotation of the apparatus about an axis normal to the plane of the enclosed path are detected independently of noise in the system and variations in the frequency of the laser.

5 Claims, 7 Drawing Figures

INTERFEROMETER

This application is a continuation in part of Ser. No. 853,033 filed Nov. 30, 1977, now abandoned.

FIELD OF THE INVENTION

The present invention relates to optical rings for detecting small changes in the time required for a light wave to pass between two points separated by a fixed distance. A ring laser for detecting rotation is a typical device of the type here involved.

BACKGROUND OF THE INVENTION

Ring lasers have been known since the early 1960's (see e.g. U.S. Pat. Nos. 3,382,759, 3,484,169, 3,486,130, 3,642,375, 3,714,607, 3,826,575, etc.). They suffer from two major drawbacks, i.e. "mode pulling" (see U.S. Pat. No. 3,382,759 col. 1, line 69) and loss of accuracy due to instability of the frequency of the laser. Mode pulling prevents the detection of low rates of rotation and frequency instability upsets the direct relationship between the measured beat frequency and the actual peripheral velocity of the ring. Many attempts, as illustrated in the above-cited references and others, have been made to solve these problems with varying degrees of success. So far, from the unclassified literature, it appears that these problems have not been solved adequately for ring lasers to go into widespread use despite the relatively low cost thereof compared to inertial systems, and a major demand therefor. Other methods of detecting rotation by the Sagnac effect have also been too crude or too cumbersome to achieve commercial success.

SUMMARY OF THE INVENTION

The basic object of the present invention is to measure minute changes in the effective path length of light passing between two points separated by a fixed distance. More specifically an object is to provide a ring-type device employing laser light in which the adverse effects of mode pulling and frequency instability are substantially overcome.

In a preferred embodiment a helium neon laser is used. The beam from the laser is split to form two beams which are again split and passed in opposite directions around a square in two parallel planes to a pair of beam combiners at the opposite diagonal from the laser and thence to a pair of photo detectors. Means are provided for repetitively varying the effective path length of the light simultaneously by the same amount of each side of the beam splitter-beam combiners, diagonally of the square. As the path lengths are varied and while the square is also rotating about an axis normal to its plane, a net shift in the interference pattern appears at each photodetector proportional to the frequency of the laser and to the peripheral velocity of the square. In the present invention this shift in the interference pattern is measured by the use of frequency generating techniques and an extremely accurate electronic counter type frequency meter.

Mode pulling is eliminated because the present arrangement is not a true ring laser. The laser light enters the ring from the outside and never doubles back on itself. The effective length of the respective light paths is independent of the laser and is not involved in the generation of the frequency of the laser beam, as in ring lasers. There is virtually no reflection of the beams back into the laser. Thus, the smallest difference in phase between the two beams in the present invention registers at the photodetectors, and no mode pulling occurs.

The arrangement of the present invention is made free of distortion attributable to instability of the frequency of the laser, by rendering the difference measurement independent of the carrier frequency as will be explained more in detail below.

Noise in the system is largely eliminated by comparing pairs of signals both pairs of which include the same noise in substantially equal amounts, thereby causing virtual cancellation of the noise.

DETAILED DESCRIPTION OF THE INVENTION

Figure 1:
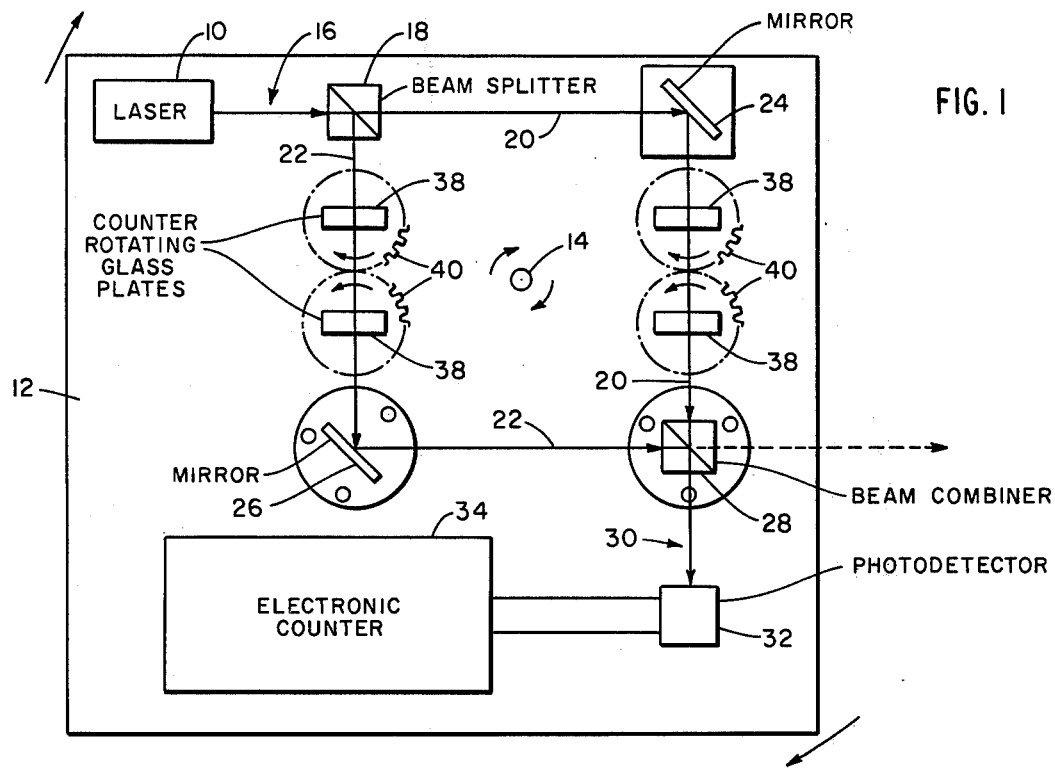
FIG. 1 is a plan view of the apparatus showing the components diagrammatically for a single light plane.

In a preferred embodiment, a helium-neon laser 10 is mounted on an optical bench 12 which may conveniently be a marble slab. The bench 12 is, in turn, mounted on bearings (not shown) for rotation about an axis 14 which is normal to the plane of the bench 12. In the embodiment shown in FIGS. 1 and 2, the beam of the laser indicated at 16 is projected into a beam splitter 18 which splits beam 16 into two beams 20 and 22 respectively. A front face mirror 24 reflects beam 20 at right angles parallel to the plane of the bench 12, and similarly a front face mirror 26 reflects beam 22 so that the two beams converge at a beam conbiner 28. Downstream of the combiner, one of the combined beams indicated at 30 is projected into a photodetector 32. The output of the photodetector 32 is fed to an electronic counter 34.

Figure 3:
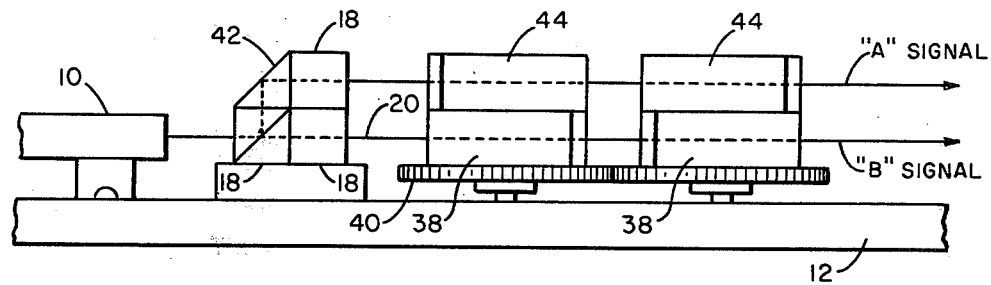
FIG. 3 is a view in side elevation of a portion of the light square showing the vertical splitting of the beam to form two parallel light planes.
Figure 4:
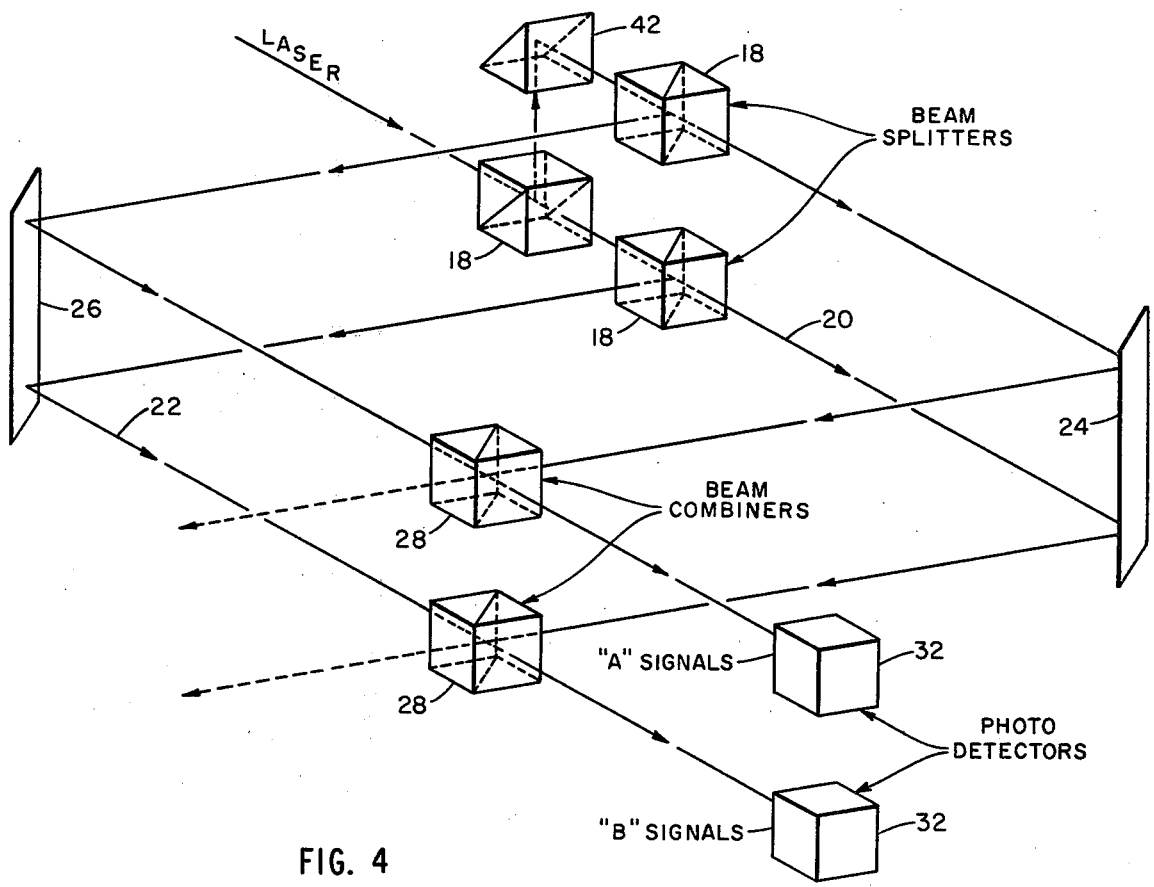
FIG. 4 is an exploded isometric perspective of the optical components for two parallel light planes.

In the embodiment shown in FIGS. 3 and 4, the beam from the laser is first split vertically, and reflected 90° by a silvered 45° prism 42, then again split to form two additional beams in a plane above but parallel to the plane of beams 20 and 22. The upper beams are reflected respectively by mirrors 24 and 26 and combined downstream by combiner 28 in the same way as beams 20 and 22. A separate photodetector 32, however, collects and detects the signals in the upper pair. In order to provide separate reference to the two sets of signals, the signals emanating from the lower plane will be referred to as the "B" signals and those emanating from the upper plane as the "A" signals.

Figure 2:
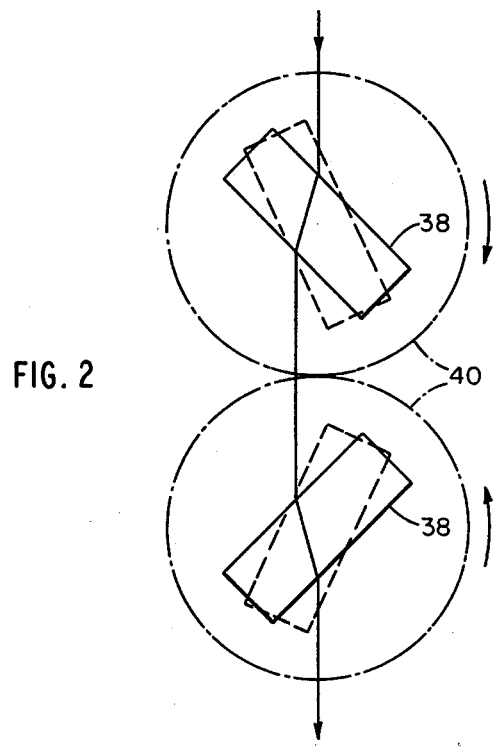
FIG. 2 is a diagrammatic view illustrating the counter rotating glass plates for a single light plane.

In the embodiment shown in FIGS. 1 and 2, in the paths of beams 20 and 22 respectively are placed a pair each of glass plates 38, making a total of four plates. Each plate 38 is mounted on a rotating gear 40. The plates 38 are optically flat, of equal thickness, and are mounted with their centers of gravity on the line of the respective laser beams. In addition, the rotational axis of each of the plates 38 is normal to the bench 12 and passes through the line of the respective beams. The drive for the gears 40 is a synchronous motor (not shown) and all gears 38 are joined by a gear drive (not shown) to rotate in unison, the respective upstream gears rotating in the opposite direction from the respective downstream gears. Finally, the plates are positioned so that all four are parallel when they are normal to the axis of the respective light beams. By this arrangement, although the light paths are offset by defraction in the upstream plates 38 as the plates rotate, an equal and opposite effect takes place in the downstream plates 38. Thus, the axis of the beams downstream of the plates 38 is not disturbed by the rotation of the plates. All that happens is that an effective lengthening or shortening of the light path takes place by virtue of both the changing geometry and the changing length of the light path in the glass (see FIG. 2).

Figure 5:
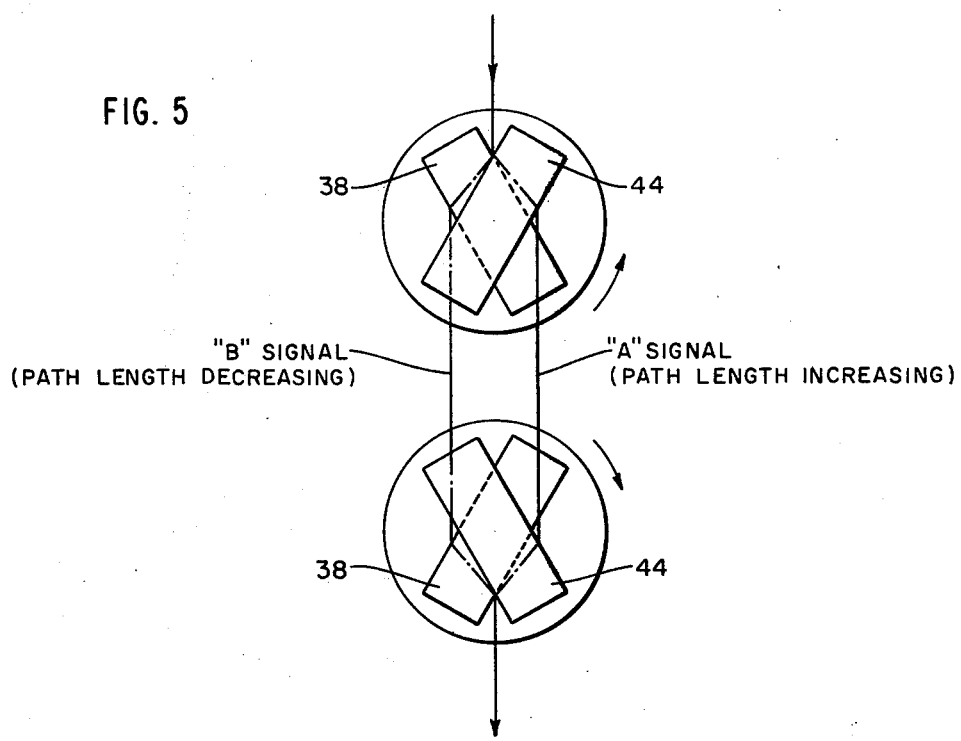
FIG. 5 is a plan view of the counter rotating plate pairs of FIG. 3.

In the embodiment of FIGS. 3, 4 and 5 a second glass plate 44 is mounted on top of each plate 38 offset by 60° thereto, and all plates are aligned so that opposed pairs are at exactly 30° from the axis of the laser beams at one given position of rotation.

The system of FIGS. 1 and 2 which employs only one pair of beams defining a light path in a single plane, is equivalent to the system of FIGS. 3, 4 and 5 in many ways but for its ability to eliminate noise, as will be described more in detail below.

The system of either embodiment is made ready for use by turning on the laser (with the plates 38 and 44 at rest), and by first adjusting mirrors 24 and 26 so that the beams in the respective planes point to respectively identical spots on the diagonal beam combining film within beam combiners 28. Downstream of the beam combiners 28, there are then two sets of combined beams one of which goes directly to the respective photodetectors and the other of which (shown in dotted lines) goes out at about 90° thereto. In the lower plane this latter beam is made up of one half of the beam 20 and one half of beam 22. The position of the combiner 28 is adjusted so that downstream the respective reflected and transmitted beams are coincident. This adjustment is made by permitting the beams to project onto a distant wall and adjusting the position of combiners 28 until the two reflected beams come together to form a single spot for the light from each plane. When this position is achieved for each pair, it automatically is achieved for the second part thereof that goes to the photodetector.

The laser 10 may be a Spectra-Physics helium-neon laser having a beam diameter of 0.88 mm with a 1 m Rad beam divergence, a 1.0 mW maximum output and a wave length of approximately $6.3 \times 10^{-5}$ cm. The beam splitter 18 and combiner 28 may be prism type, 15 mm sided cubes formed each by a pair of right angle prisms centered together, and rated to transmit approximately 30° of the light in each of the two resulting beams.

Right angled prism 42 has its internal hypoteneuse silvered. It is cemented to beam splitters 18, and they to each other by optical cement having an index of refraction nearly identical to the glass of the beam splitters. In this way surface losses are reduced to a minimum.

The mirrors 24 and 26 are aluminized front surface mirrors on optically flat (¼ wave) glass.

The plates 38 need only be reasonably optically flat and have substantially parallel surfaces. They can be conventional crown glass having an index of refraction of approximately 1.53.

The photodetector 32 can be a simple photo diode capable of detecting frequencies from 50 Hz to 50 kHz. In some cases it may be necessary to detect frequencies up to 100 mHz and an "avalanche" type photodiode having a built-in amplification process, will be needed.

A suitable electronic counter will be described more in detail below.

When the beams are properly adjusted as described with the components listed above, disposed in optical squares having 35 cm on each side, a virtually total "on-off" condition exists in the respectively combined beams, such that virtually no light is transmitted when the light waves are out of phase, and the transmission is particularly strong when the waves are in phase. This "on-off" feature is made possible by the fact that the wave front of the light extends across the full width of the beams, and the chord of the wave front is substantially less than the wave length of the light. Under these conditions, the usually observed parallel fringes do not appear because the whole wave front is either at or close to the center of the fringe pattern and it covers the entire width of the beam. This is a very useful feature of the present equipment because it provides for highly efficient photodetection. It should be noted that the classical method of collimating and projecting the beams at a slight angle in order to show fringes is specifically avoided. Here the maximum "on-off" condition of highest efficiency exists when the "raw" beams completely coincide.

In the embodiments herein described I drive the gears 38 in unison by means of a synchronous motor (not shown). In order to improve synchronization with the gate circuits in the counter, I derive the alternating current for the motor drive from the counter itself. Thus, the counter is provided with a 10 mHz output feature (governed by the clock of the counter) which I divide down to 100 Hz and amplify suitably to drive the motor at a rotational rate of 10 r.p.s.

The path length increase due to the rotation of the glass plates is as follows. Taking a 10° segment of the rotation from 55° to 65°, a thickness for the glass plates of 1" and an index of refraction of 1.53, the path length increases 0.05643" in the glass and 0.0051" in the air. This gives a total delay for each glass plate equivalent to an increase of 0.09130 inches in air, or 0.231902 cm. If the plates are rotating at 10 r.p.s. the rate of this path length increase for the 10° sector in question is 80.348472 cm/sec. Since there are four such glass plates in each light plane, the effective rate of increase of path length for such a rotational rate is 321.393888 cm/sec. If the bench 12 is rotating and one assumes for convenience of computation a peripheral velocity of the optical square of 1 cm/sec, the difference in path length of the light due to rotation may be determined according to Sagnac's formula $$\Delta S = (2V/C)S$$

where v is the peripheral velocity in cm/sec, and S is the path length. In this case S is not the original path length but instead, the amount of the increase per second, i.e. 321.393888 cm/sec for the sector between 55° and 65°. This gives a value for $\Delta$ S of $1.07 \times 10^{-8}$ which is 0.00016894 of a fringe of the light at the frequency employed in this example.

When beams 20 and 22 are combined, the effective path lengths of the beams 20 and 22 are changed strictly in unison, and theoretically no beat note will appear at the photodetector 28 in the non-rotating condition. In the present apparatus, however, such system accuracies are impossible and random beat notes will appear due to imperfections in the glass. In order to account for same, as well as to render the beat notes detected of the same sign, and to assist in the frequency measurements, the plates 38 are adjusted to give a beat note of approximately 2000 Hz. The counting apparatus is then set to sample the beat frequency corresponding to specific sectors of the rotation of the plates. In the embodiment of FIGS. 1 and 2 the sectors are sampled at different times. The two sectors are identical except that they are selected so that the effective path length is lengthening in one (the "A" signals) and shortening in the other (the "B" signals). Thus, for each rotation of the plates, the counting apparatus samples the beat frequency appearing in identically complementary sectors of the rotation of the plates. The beat notes of the respective sectors are separately measured in the counting apparatus and compared. With the system in the non-rotating state the average beat frequency in the respective sectors is the same. In the rotating state, a difference between the beat frequencies appears, which difference is substantially proportional to the rate of rotation.

Figure 6:
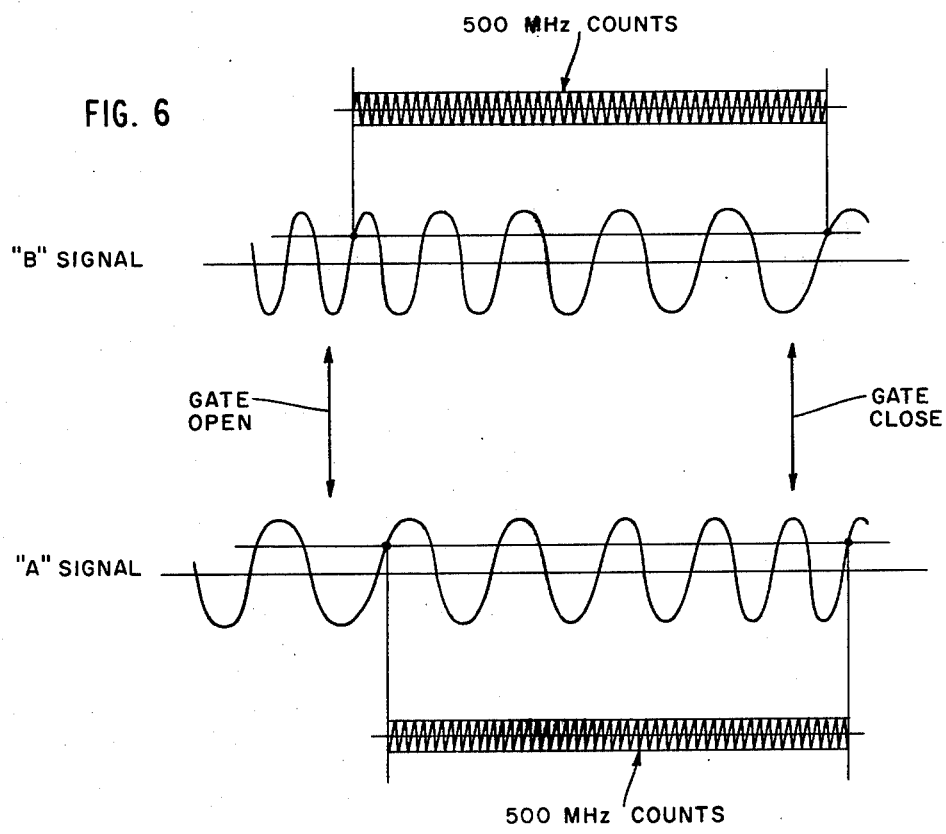
FIG. 6 is a graphic view illustrating the frequency measuring and averaging method employed.
Figure 7:
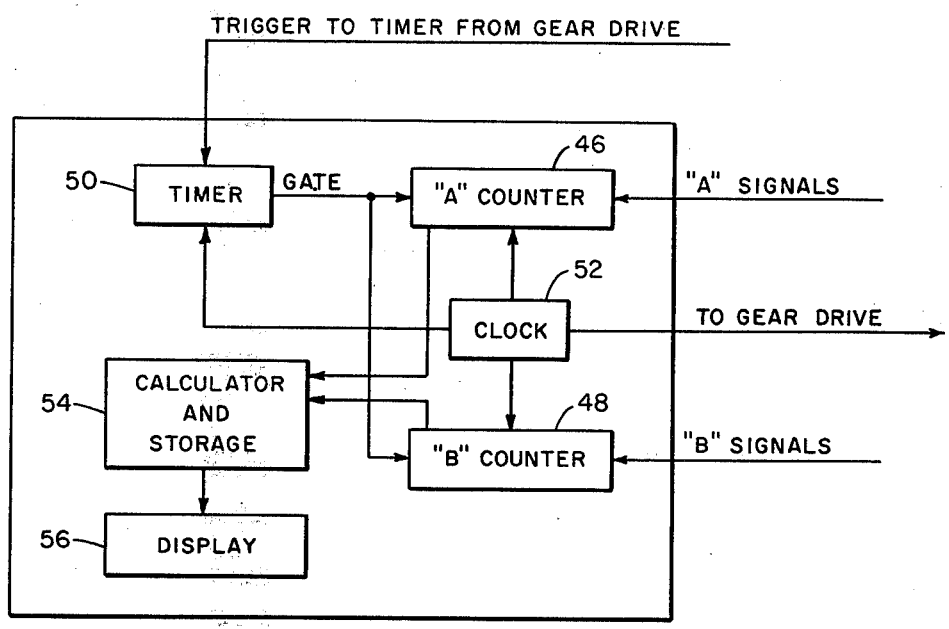
FIG. 7 is a block diagram of the components of the counter.

The counting apparatus is illustrated in FIG. 7. It includes an "A" signal counter 46, a "B" signal counter 48, a timer 50, a clock 52, a calculator 54, and a display 56. The counters 46 and 48 may be a pair of Hewlett-Packard counters Nos. 5345A. These counters are each equipped with a 10 mHz clock, only one of which, however, is used here and serves as the clock 52. The timer 50 also uses the same clock, as does the power source for the synchronous motors which drive the gears 40. Timer 50 provides external −1V gate signals for the counters 46 and 48 selected to open the gates for the "A" and "B" signals to their respective timers so that signals from reciprocal sectors of the rotation are sampled. The counting procedure is illustrated in FIG. 6. The external gate signal arms the counter which thereafter starts counting when the signal again rises to a given value above zero. Thereafter the counter counts both the signal cycles and the clock pulses until the gate terminates and the signal again rises to the given value above zero. It then reads out the average frequency of the signals received. The clock pulses used for counting in the HP 5345A are at a rate of 500 mHz. However, counting at a higher rate is possible and would be preferable in the context of this invention. The outputs of the counters are fed to a calculator 54 and display 56 which may be a HP 9825A, which accumulates, compares, stores and displays the resultants. In the long term averaging mode, the counters accumulate their readings over periods of up to 1000 sec. at the end of which they provide an accumulated average to a resolution of up to $10^{-12}$ Hz. In the illustrative example, the accumulated averages in the "A" and "B" channels are entered into the calculator, compared, and a difference is read out.

In order to illustrate the mode of operation and the degree of sensitivity obtainable with the described equipment, an average beat note of exactly 2 kHz for signals from the respective "A" and "B" signals will be assumed while the system is at rest. In addition, the above-described parameters for the rotating system are assumed, (i.e. 35 cm sided square, 1 cm/sec peripheral velocity, effective path lengthening rate of 321.39388 cm/sec, and a gate time of 2.7 millisecs), from which a difference in frequency of 0.00016894 Hz from 2000 Hz will appear in each beat frequency; that is, 2000.00016894 Hz in the sector of decreasing length, and 1999.999831 Hz in the sector of increasing length, giving a total difference between the two of 0.00033788 Hz. The counter will have five full cycles of each frequency to analyze in this example, and by averaging over a period equal to 1 second of accumulated signal (i.e. 6 min. 40 sec), it can achieve a resolution of $10^{-9}$. Thus, with the system at rest the counter indicates no difference between the "A" and "B" signals, and each signal has an individual reading of 2000.0000 Hz. If the system is then rotated at a peripheral velocity of 1 cm/sec, the difference reading will be 0.00037 (after 6 min. 40 sec). As above noted, resolution can be improved by longer averaging.

The primary problem with this type of system and attempting to achieve resolutions of $10^{-9}$ or greater, is noise. Random noise, of course, can eventually be averaged out, but it then becomes a question of time. For example, in the practice of the embodiment of FIGS. 1 and 2 in which the "A" and "B" signals occur at different times, each signal has slightly different noise in it, which shows up in the count. This caused a substantial increase in the time needed to achieve the desired resolution. The embodiment of FIGS. 3-5 largely overcomes this disadvantage because the same gate signal is used for both the "A" and the "B" signals. The noise is, therefore, largely the same in each signal and cancels out when they are compared. In FIG. 6 signals of rapidly varying frequency are depicted. Thus as shown the "B" signal is dropping in frequency whereas the "A" signal is rising. In practice, however, these signals are more uniform and the start count and stop count points are more nearly identical for each signal. It is desireable to make them as nearly identical as possible because it is the noise which occurs while one counter only is counting, which causes the problem. Additional conventional techniques for noise suppression may also be used including RF chokes, RC filters, phase locked loops and the like. In addition, the entire optical ring can be covered and the air evacuated to eliminate random noise due to air currents in the light path.

While the above-described system is rotating in an axis normal to the plane of the optical square, errors occur due to variations of laser frequency. Complete cancellation, however, of these errors occurs when the system is not rotating because there is no difference between the respective beat frequencies at that time, at which time their actual frequency is irrelevant. Accordingly, by detecting a difference between the respective beat frequencies, and servoing (or otherwise controlling) the system in response thereto to stop the rotation, cures the error and, within the accuracy limits of the system, provides a stable platform from which the rotational rate of other things can be measured. Rendering the platform stable on all axes by the use of three such squares, orthogonally arranged also eliminates gyroscopic precession which can disturb the rotating plates 38.

The counters 46 and 48 and calculator 54 need not be as sophisticated as the actual HP 5345A and 9825A. Thus, the clock 52 need not be highly stable or temperature controlled as in the HP 5345A. Since the object is to merely compare the "A" and "B" signals and to servo the system to make them equal, there is no need to know their actual frequency. All that is needed is a high frequency for the counter. It would therefore be preferable to employ much higher frequency counting at, for example, 20 gHz. In addition the HP 5345A is provided with a wide variety of operational options which have no relevance in the present context. All that is needed here is the frequency averaging functions of the HP 5345A. Likewise the calculator can be streamlined to accumulate the frequency average counts of the counters, display them individually, compare them and display the difference. This can be done with simple counting circuits at much less expense. The HP equipments as described herein are merely illustrative of a workable combination, but are far more expensive than necessary for the job at hand due to the fact that they include a large amount of apparatus having no relevance to this context.

The accuracy of the system depends upon timing the gate pulses accurately to select precisely complementary sectors for sampling by the counter so that the respective average beat frequencies thereof are as nearly equal as possible with the system at rest. Synchronism for this purpose is facilitated by deriving the timing for the gate pulses from the same timing source as that used for the alternating current for the synchronous motor which drives the gears 40 and plates 38. Calibration is done with the plane of bench 12 parallel to the rotational axis of the earth in order to eliminate the effect of earth rotation.

When the counting is done at a rate of 20 gHz, the resolution is increased by a factor of 40 over the 500 mHz rate of the HP 5345As. This greatly reduces the time needed to reach a given degree of resolution. Thus a resolution of $10^{-9}$ can be reached in 10 sec at this counting rate, and $10^{-11}$ in $16\frac{2}{3}$ min. This would permit detection of rotational rates of 1/67900 cm in the above described example which is about 0.003°/sec or about 0.29°/hr. This compares favorably with the best inertial systems known today which cannot guarantee any better accuracy. Improved accuracy can be obtained by longer term averaging.

It will be noted that the equipment used is relatively inexpensive. The counters each cost about $4600. Due to the fact that the two halves of the system tend to cancel out errors due to frequency shifts, thermal conditions and the like, and averaging largely elimintes random noise, there is no need to use highly sophisticated expensive, optical equipment. Thus, the laser, photodetector, and mounting therefore, can all be purchased from scientific instrument supply houses such as Edmund Scientific Co., and set up within the range of $1000 for parts alone. The timer can be made for about $300 and the counting, storing, comparing and display circuitry can be made for around $500.

Other uses for the device are also available. For example, the plates 40 on one side of the square can be made hollow and filled with liquids or gasses to measure their refractive index. The measurement provided by the counter in this instance is a comparative only, but the refractive index of the sample can be computed if the refractive index of the glass plates is known. The measurements in this mode of operation should be made with the bench 12 tilted upwardly to the north at an angle equal to the latitude of the measuring cite in order to eliminate error due to the earth's rotation.

The effects of tension, pressure, and electric, magnetic and gravitational fields can also be measured to the extent that they influence the velocity of light and can be applied selectively to one side of the square. In addition, the equipment provides a possibility of exploring more exotic phenomena, and questions such as whether or not, or the extent to which, rotation detection by the Sagnac method depends upon the presence of a gravitational field, or the extent to which the drag effect of the glass on the light affects the problem. In these applications, the stability of the clock of the HP 5345A would be a desireable feature.

The extreme accuracies provided by the present equipment are made possible by the automatic elimination, by heterodyning, of the very high frequencies involved, thereby effectively bringing the critical difference measurement within reach of the electronic counters. With the present set-up, if the path length of the light were increased on only one side of the square, (assuming the above described 10° sector only and 10 r.p.s. rotational rate for the plates 38), the beat frequency would be about 5 mHz, and the counter would have little possibility of detecting the 0.00679 Hz difference, because the counter's maximum resolution for the 6 min. 40 sec. period noted above is only $10^{-9}$. In fact, the frequency would have to be heterodyned down to about 100 kHz before a useful difference could be noted. Bringing it down to 2000 Hz, however, places the difference measurement well within reach of the counter. It also should be noted that, even though the beat frequencies are non-uniform due to the non-uniform increases in path lengths during rotation of the plates, this non-uniformity makes no difference to the counter because it measures the wave form in terms of real time, and non-uniformity of the wave form between the limits of the measurements are ignored except to the extent that the separate events are counted. This is a good feature because it permits the use of the rotating plates 40 without which the path variation, upon which the system depends, would be extremely difficult to attain. The rotating equipment, in fact, remains extremely stable and the beat note is easily detected.

Several sources of possible error exist. Thus, if changes in temperature or anything else influences the position of one or more of the elements on one side of the square and not on the other, an error-producing shift in the fringes will occur. These things, however, are not especially difficult to control. Small random vibrations, slop in the bearings, etc., also can cause erroneous shifts, but they cancel out in the device of FIGS. 3-5. The counter requires at least one full cycle in order to perform the measurement because the measurement constitutes essentially the interval of time between zero crossings of the signal. Given one full cycle to measure on a repetitive basis the counter can gradually develop its full potential accuracy.

The system is calibrated by tilting the optical bench so that it points toward the north star (i.e. so that it is not rotating), and then the gate is adjusted so that the "A" and "B" signals are substantially equal. In this case, the noise influence enters substantially equally into each measurement, and since the difference between the counts is all that is of interest, the noise cancels out. This permits the attainment of the required resolution in much less time than with the arrangement of FIGS. 1 and 2. Other variations of the above can be considered. For example, it is possible to pass a prism through the light path in such a way as to change the path length without disturbing the downstream axis, using a linear track. This is done with a 30° prism and directing the light so that the path of the light in the prism is normal to the plane bisecting the 30°. The linear track is parallel to that plane. This has the advantage of producing a uniform rate of effective path lengthening provided the motion of the prism is uniform. Such an arrangement comes within the scope of the present concept.

Another alternative comprises splitting the initial beam twice and forming 2 parallel coaxial squares as in FIGS. 3-5 but with the path changing devices in one side only of each square each acting only to lengthen the path in one square and shorten it in the other. In this alternative the "A" and "B" signals are both in the multi MHz frequency band and avalanche type photodiodes are employed. Heterodyning down to a suitable low frequency is then done externally using a common local oscillator, before measuring the critical difference in frequency due to rotation.

In the foregoing description, I have repeatedly referred to changing the effective path length of the respective beams. It will be understood, however, that the glass plates 38 merely comprise a delay mechanism for the light, and rotation of the glass plates merely changes the amount of the delay. Basically, to the extent that similar delays can be accomplished using magneto-optical, or electro-optical devices to produce beat frequencies that are acceptable to the counter they can be used, with the consequent advantage of having no moving parts. In addition, such devices can be triggered and controlled by signals derived from the counter, thereby assuring synchronism. They, therefore, offer certain advantages provided they are adjusted to enter the path length change in a gradual manner (as distinct from being instantaneous), so that a beat frequency can be derived from differences in path lengthening during the change, and also provided the duration of the change is long enough to give the counter one full cycle of the beat frequency to analyze.

Accordingly, it is my intention not to confine the invention to the preferred embodiment herein shown but rather to limit it in terms of the appended claims.

I claim:

1. Apparatus for determining and measuring changes in the length of the effective light path between two fixed points on an enclosed light path, comprising:
   a laser for generating a beam of coherent light;
   means for projecting the beam into the enclosed light path;
   means for splitting the beam and passing the split portions around the enclosed path in opposite directions;
   means for combining the split portions at a common point in said path at which they first meet, to form at least one combined beam which is made up of a part of each split beam portion;
   means for retarding the passage of light in at least one portion of the split beam;
   means for periodically varying the amount of retardation brought about by said retardation means to produce a beat frequency in said combined beam; and
   means for detecting and measuring the beat frequency of the combined beam at the time when the retardation is being varied.

2. The apparatus defined in claim 1 further characterized by a second light path and associated means identical to and parallel to the one defined in claim 1 together with means for splitting the laser beam upstream thereof to form two laser beams one each of which is fed to each light path, means for simultaneously oppositely varying the retardation means in the two light paths, and means for simultaneously comparing the resulting beat frequencies.

3. Apparatus for measuring rotation comprising:
   a laser;
   an enclosed light path;
   means for projecting a beam from the laser into the light path;
   means for splitting the beam and directing the split portions thereof in opposite directions around the enclosed path to a common point;
   means at the common point for combining the split portions of the beam into a single beam which is made up of a part of each split portion;
   means for alternately lengthening and shortening the effective path length of at least one split portion of the beam to produce a beat frequency in the combined beam; and
   means for comparing the beat frequency while the path length is increasing with that while decreasing to detect differences in the effective path lengths of the two split portions due to rotation of the enclosed path about an axis normal to the plane of the enclosed path.

4. The apparatus defined in claim 3 further characterized by a second light path and associated means as defined in claim 3 identical to and parallel to the one defined in claim 3 together with means for splitting the laser beam upstream thereof to form two laser beams one each of which is fed to each light path, means for simultaneously oppositely varying the retardation means in the two light paths, and means for simultaneously comparing the resulting beat frequencies.

5. Apparatus for detecting rotation by the Sagnac effect comprising:
   a laser;
   means for projecting light from the laser, splitting it to form two beams, further splitting each beam and directing each split portion around opposites of two offset, parallel light paths to a beam combiner for each light path;
   means for simultaneously increasing the effective path lengths on both sides of the combiner in one said path, and for simultaneously decreasing the effecting path lengths on both sides of the combiner in the other to produce, while said apparatus is not rotating on an axis normal to the planes of said paths, substantially equal beat frequencies in each said combined beam during the respective changes in path lengths;
   means for detecting and comparing the beat frequencies of said combined beams, whereby no difference between said beat frequencies indicates no rotation; and
   means for controlling the rotation of said apparatus on said axis to maintain a condition of no difference between said beat frequencies.

* * * * *